Nov. 16, 1954 L. H. CONNELL 2,694,754

MAGNETIC RECORDING APPARATUS

Filed June 12, 1950 3 Sheets-Sheet 1

*INVENTOR.*
LAWRENCE H. CONNELL
BY Whittemore Hulbert & Belknap
ATTORNEYS

INVENTOR.
LAWRENCE H. CONNELL
BY Whittemore, Hulbert & Belknap
ATTORNEYS

Nov. 16, 1954

L. H. CONNELL 2,694,754

MAGNETIC RECORDING APPARATUS

Filed June 12, 1950

3 Sheets-Sheet 3

INVENTOR.
LAWRENCE H. CONNELL
BY Whittemore, Hulbert & Belknap
ATTORNEYS

United States Patent Office 2,694,754

Patented Nov. 16, 1954

2,694,754

MAGNETIC RECORDING APPARATUS

Lawrence H. Connell, Detroit, Mich.

Application June 12, 1950, Serial No. 167,669

5 Claims. (Cl. 179—100.2)

The present invention relates to magnetic recording apparatus, and more particularly to a novel recording head.

It is an object of the present invention to provide a recording head for magnetic recording which is characterized by the reduction of distortion in low audio frequency recording.

More specifically, it is an object of the present invention to provide a magnetic recording head characterized by the provision of a plurality of cooperating gaps.

It is a further object of the present invention to provide a magnetic recording head having a plurality of gaps therein operating to produce a single record.

It is a further object of the present invention to provide a magnetic recording head having a plurality of gaps and provided with a common magnetic circuit.

It is a further object of the present invention to provide a magnetic recording head having a plurality of magnetic gaps, all of which are energized from the same electric circuit.

It is a further object of the present invention to provide a magnetic recording head having a plurality of magnetic gaps sequentially effective on an advancing tape or other record element, and more particularly, one in which the gap last or finally effective on the tape is relatively narrow as compared to the preceding gap or gaps.

It is a further object of the present invention to provide a magnetic recording head having a plurality of gaps characterized by a construction providing for greater intensity of magnetic force across the gap last effective on advancing tape or other record material.

Other objects and features of the invention will become apparent as the description proceeds, especially when taken in conjunction with the accompanying drawings, wherein.

It has been observed that when using axial magnetic recording (recording in which the magnet poles are spaced apart along the length of the tape or wire), distortion which was particularly noticeable in the low audio frequency occurred. A low audio frequency sine wave after recording showed very considerable distortion on play-back.

Figure 1:
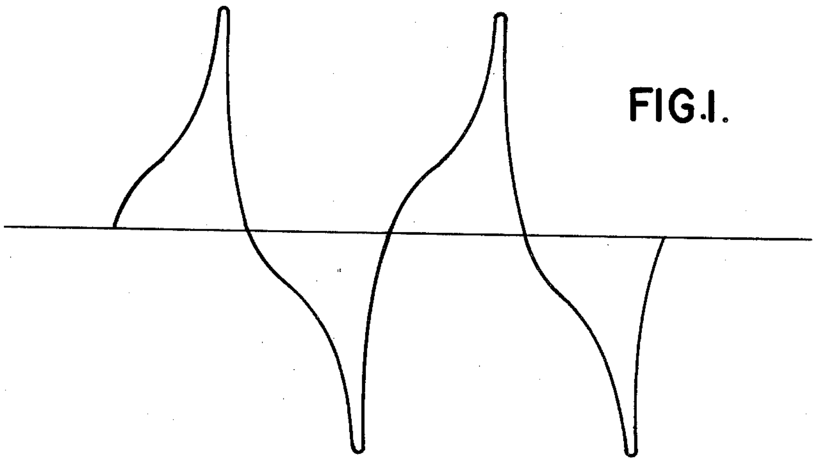
Figure 1 is a diagram illustrating the type of distortion observed in magnetic recording of low audio frequency.

In Figure 1 there is illustrated a curve produced by plotting amplitude (either voltage or current) against time on play-back of a recorded sound which in its initial audio form was a low frequency audio sine wave. This curve represents an average of actual curves observed on an oscilloscope. It will be apparent that this curve may be considered as a low amplitude low frequency wave combined with a relatively high amplitude pulse.

Early experimentation indicated that recording heads of the type previously known which were more efficient at high audio frequencies, produced greater distortion at low audio frequencies. Increasing the amplitude of the signal to be recorded made the distortion in the low frequencies worse. Moreover, it was observed that the distortion became worse as the frequency of the signal decreased. The Fourier analysis of a wave, such as shown in full lines in Figure 1, has harmonics having total amplitude higher than the fundamental.

The difficulty is severe. It is customary to employ a frequency selective corrective circuit which amplifies high and low audio frequencies to a much greater extent than middle frequencies. When the low frequency signal as recorded generates a series of relatively high amplitude pulses on reproduction, the circuit amplifies these pulses as high frequency harmonics of the low frequency signal, and this results in audibly objectionable distortion.

Investigation revealed that the overall difficulty was in the recording rather than in the play-back. Apparatus forming the subject matter of the present invention has been developed which overcomes the previous difficulties to a considerable extent and a tentative theory explaining the operation of the mechanism evolved has been developed. The theory with the immediate facts that led to it, are presented in the following paragraphs.

The generally accepted prior art assumed that any wave to be recorded could be expressed by a Fourier series of sine waves. The discussion that follows assumes a sine wave.

The generally accepted theory of the prior art was that in recording, the external magnetizing force available for magnetizing the portion of the record element between the poles of the head depended upon the instantaneous amplitude of the recording current and determined the instantaneous flux passing through the tape between the poles of the recording head.

It is also well known that the instantaneous flux through the play-back head is dependent upon the magnetic potential between the poles of the play-back head. Magnetic potential is supplied by the permanent magnetization of that portion of the tape between the poles. The voltage induced in the play-back head is a function of the rate of change of flux through the magnetic circuit. If the tape moves at a constant speed, the voltage becomes a function of the rate of change of magnetic potential between the poles of the play-back head. The rate of change of magnetic potential between the poles of the play-back head may be mathematically expressed as the differential of the magnetization along the tape. Since the differential of a sine wave is another sine wave shifted 90 degrees on the time axis, at the time of maximum amplitude of a sine wave to be recorded, the differential of the magnetization or the rate of change of the magnetic potential is zero. This is for the reason that at that instant the rate of change of magnetization approaches zero.

At the time of maximum amplitude of the wave to be recorded (or the maximum amplitude of the magnetizing current), the rate of change of magnetization approaches zero. It follows that the low amplitude portions of the play-back wave correspond in a time sense to the high amplitude portions of the recording wave. Similarly, the high amplitude portions of the play-back wave correspond in a time sense and are the result of the low amplitude portions of the recording wave.

The magnetic recording tape available at this time has a very high coercive force; or in other words, the minimum magnetizing force is high. While it is recognized that minimum magnetizing force is not always the opposite of coercive force, coercive force is hereafter used as representing the magnitude of the quantity under discussion. Two of the effects of this high coercive force are particularly important during recording. In the first place, the magnetic flux goes from one recording head pole through that portion of the tape spanning the gap to the other recording head pole. The material of the magnet, including the poles, is chosen to have a very low coercive force. Since the tape has a relatively high coercive force, the path through the tape will be as short as possible. This will result in crowding the flux into those portions of the poles immediately adjacent the gap. As a result of this the portions of the pole face immediately adjacent the gap approach saturation. In the second place, if the portion of the tape spanning the gap is already magnetized, a much lower reluctance path will be offered to flux if the external magnetizing force is in the direction of the magnetization of the tape.

Figure 2A:
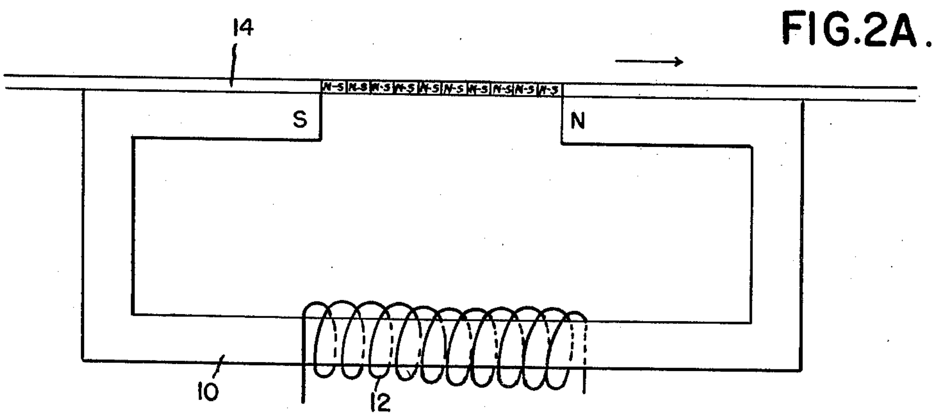
Figure 2A is a diagrammatic view illustrating a recording magnet associated with an advancing tape or other record element.
Figure 2B:
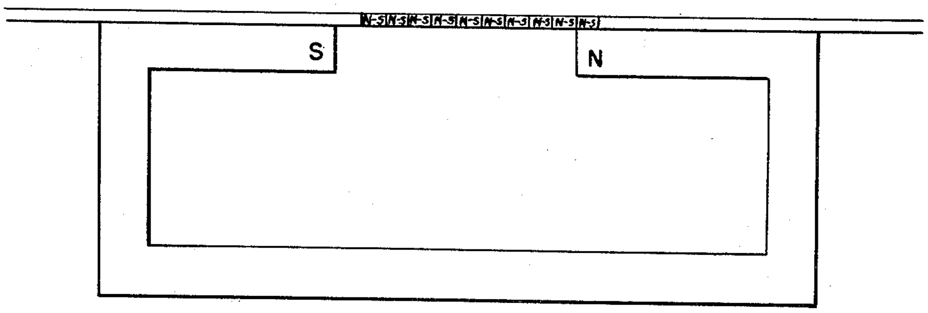
Figure 2B is a view similar to Figure 1 illustrating the condition when the tape has advanced slightly from the position shown in Figure 2A.

Referring now to Figures 2A and 2B there is illustrated a magnet 10 which is assumed to be a recording magnetic head provided with an external magnetizing circuit diagrammatically indicated at 12. The magnet 10 has poles which are assumed at the instant under consideration to be south and north poles as indicated. That portion of the recording tape or other record element 14 which spans the gap between the north and south poles is illustrated as divided into a plurality of sections, each of which is magnetized at least partially in the direction shown.

It is assumed that a low audio frequency wave is being recorded and that Figure 2A shows a condition in which the current wave has passed through zero and is increasing in such a direction as to create the polarity shown. It is further assumed that at this instant the magnetization across the gap is uniform.

Figure 2B shows the condition which will exist if the tape continues to advance, disregarding the effect of the magnetizing current in the circuit 12. In Figure 2B this circuit is omitted. The tape has advanced a small amount bringing an unmagnetized section into the gap. However, the previously magnetized sections which remain in the gap set up a field tending to magnetize the unmagnetized section. Thus, there is one factor that tends to make the magnetization cumulative as long as the magnetizing current continues in the same direction.

So long as the magnetizing force is increasing in the same direction, there are two factors tending to magnetize each new element of tape as it enters the gap. The first of these is the external magnetizing force set up by current flowing in the magnetizing coil of the circuit 12. The second of these is the self-magnetizing effect of that portion of the tape remaining in the gap between the poles. Thus, disproportionately high magnetization may continue well past the peak of current.

The play-back pulse voltage is generated by the sudden rapid change in magnetization that results when the magnetizing current reverses and reaches a magnitude sufficiently large to overcome the self magnetizing effect. It would obviously be desirable to have the magnetization more closely follow the magnetizing current.

According to the present invention, a special type of magnetic recording head has been developed which results in the tape being premagnetized prior to its passage across the final recording gap.

At conventional tape speeds, one-half cycle of a low frequency wave covers a distance along the tape that is many times the effective gap width. This affords the possibility of supplying the final gap with tape that instead of being unmagnetized, is partially magnetized in the correct direction. According to the present invention, this result is accomplished by providing a preliminary magnetizing gap in such close proximity to the final magnetizing gap of the head as to effect a preliminary magnetization of the advancing tape which, except for a negligible time interval, results in preliminary magnetization of the tape in the correct direction before it enters the final gap. As a result, low frequency signals are recorded at a much higher amplitude, and play-back distortion is materially reduced.

Effectively, the approaching pole is spread. Thus the situation illustrated in Figure 2B is never realized as concerns a low frequency wave. The incremental section coming into the gap is already magnetized in the correct direction. Thus the magnetic potential across the gap acts to produce flux without having to overcome the coercive force of the increment of tape moving into the gap. Therefore, the tendency is to render the magnetization over the gap more uniform and at a higher level than would otherwise be achived. In other words, the level of magnetization follows more closely the instantaneous level of magnetizing current.

The recording head for accomplishing the foregoing results comprises a single thin departing pole and two spaced apart approaching poles, thus producing two magnetic gaps spaced longitudinally of the advancing tape.

A low impedance device promised to be easier to construct and to be more readily adaptable to low cost mass production. Single turn windings carrying the same current were provided. It was also necessary to design the head so as to have the second gap override in the case of a frequency such that the two gaps tended to produce magnetization in opposite directions. This was solved by making the second gap mentioned narrower than the first, since the ampere turns per inch is inversely proportional to the gap length. Experiments demonstrate that any loss in amplitude of high frequency reproduction is negligible.

Figure 3:
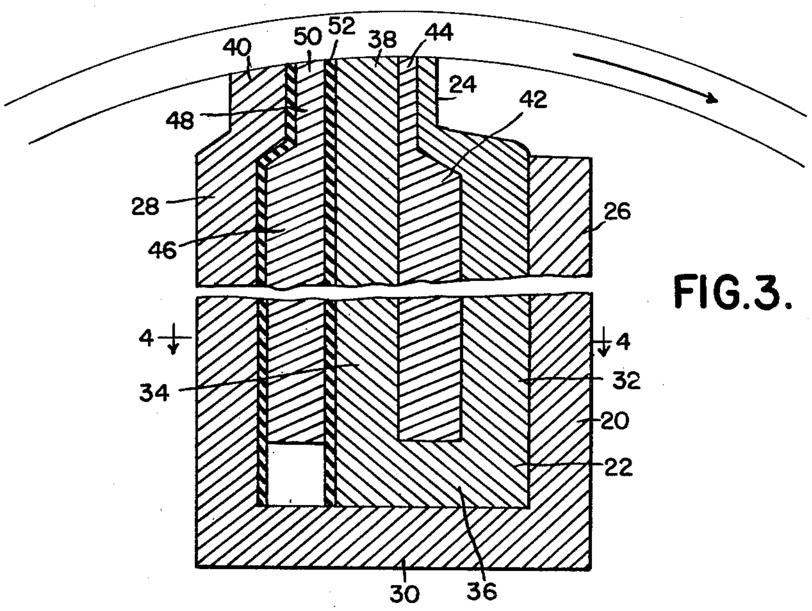
Figure 3 is a transverse section through a magnetic recording head of the type disclosed herein.
Figure 4:
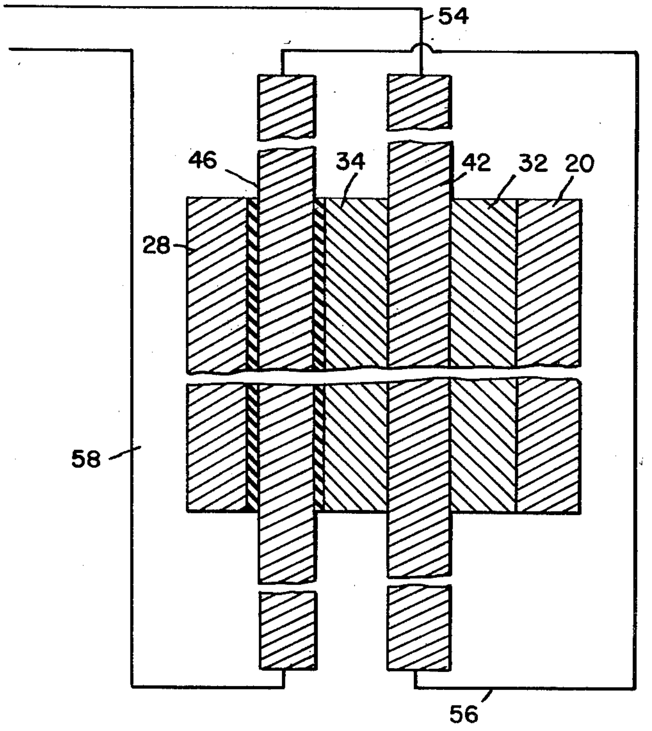
Figure 4 is a sectional view on the line 4—4 Figure 3, showing external circuit connections.

Referring now to Figures 3 and 4, the recording head is illustrated. The head comprises essentially two iron elements 20 and 22. These pieces are of an overall thickness of .002″ and are formed of oriented iron cut so that the flux path is in general parallel to the rolling direction. This material, generally referred to as oriented iron, is actually a heat treated silicon steel. The element 22 has a pole portion 24 which constitutes the departing pole of the recording head and this portion is etched to extreme thinness. Actually, in the specific head constructed and tested the thickness of this pole 24 was on the order of .0006″. The element 20 has two legs 26 and 28 interconnected by a portion 30. The element 22 has two legs 32 and 34 interconnected by a portion 36. The legs 26 and 32 are in contact in effect constituting a single path for flux. The upper end of the leg 34 constitutes an intermediate pole 38 which is of the full thickness of the element 22, or about .002″. The upper end of the leg 28 constitutes the approaching pole 40 and is also of the full thickness of the element, or about .002″.

Intermediate the legs 32 and 34 is a copper strip 42, the upper edge of which is etched to extreme thinness, being about .0006″ in the specific embodiment of the invention constructed and tested. The thin etched portion of the copper strip 42 constitutes a magnetic gap 44. A second copper strip 46 is provided intermediate the legs 28 and 34 and has one edge etched to reduce thickness as indicated at 48. The etched portion 48, together with additional parts later to be described, constitutes a first magnetic gap 50. In the specific example so far constructed and tested, the etched edge 48 of the copper strip has a thickness of .001″. The copper strip 46 is insulated from the adjacent legs 28 and 34 by extremely thin strips of mica as indicated at 52.

In constructing the head the elements are assembled together as shown and are clamped under pressure and covered with a suitable plastic material. The copper strips 42 and 46 lead out from the head proper for connection to external wiring elements.

Figure 6:
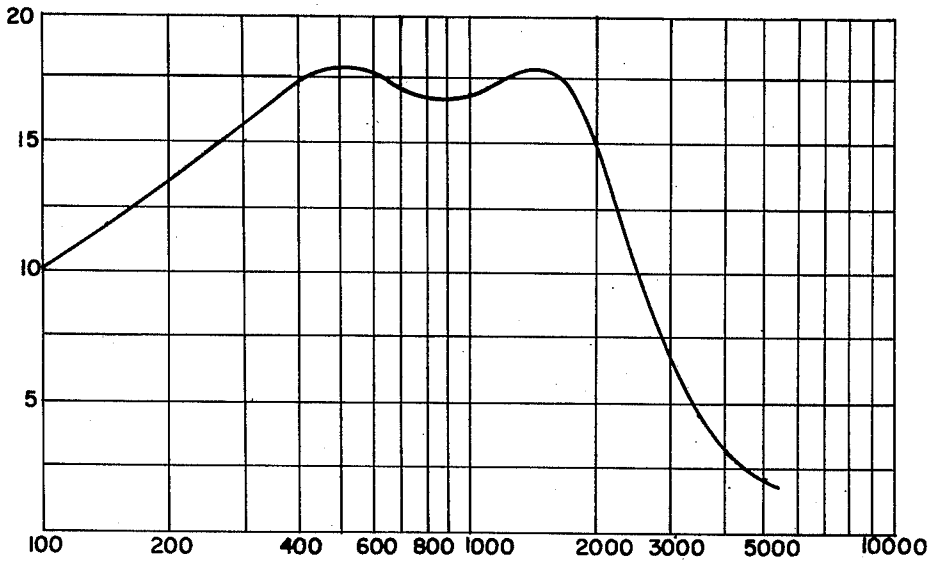
Figure 6 is a diagram illustrating the shape of the input-output curve.

The electrical circuit for the head as illustrated in Figure 6, comprises a wire 54 connected to one side of the copper strip 42, a second wire 56 connected to the opposite side of the copper strip 42 and leading to a projecting edge of the copper strip 46. A wire 58 then is connected to the other edge of the copper strip 46 and returns to the main energizing circuit.

Figure 5:
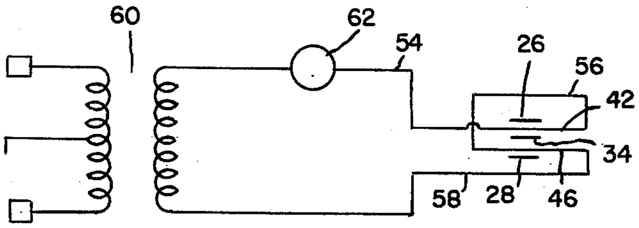
Figure 5 is a wiring diagram showing the connections to the magnetic recording head.

This circuit is illustrated in Figure 5 in which 60 represents a transformer designed to go from the high impedance of vacuum tubes to a low impedance; actually from a plate-to-plate impedance of 8000 ohms to about .2 ohm. At 62 there is indicated an ammeter located in the energizing circuit. Ten ampere peaks of any one frequency were easily obtained in this circuit with very little distortion.

The entire electrical circuit is designed to operate as nearly linearly as possible. If high freqquency bias is used the signal and the bias are mixed and fed to the driving tubes. The output is preferably unmodulated.

If two frequencies such as bias and audio frequency are mixed, the current in the low impedance circuit must be measured on a peak basis. Root mean square currents are very misleading and if employed as a basis for determining performance, are apt to cause distortion due to the tubes in the transformer circuit operating in a non-linear region.

While reference was previously made to the fact that this invention may use magnetizing currents in which audio frequency is combined with high frequency bias, other means of accomplishing a high current low voltage mixture will be obvious to those skilled in the art. Also other means such as disclosed in my prior copending application, Serial No. 45,711 filed August 23, 1948 (now Patent 2,604,546), may be used to compensate for the coercive force of the tape.

In Figure 6 there is shown a curve representing the improvement in fidelity and reduction of distortion which results from a practice of the present invention. In this figure the ordinate is relative output as compared to input in appropriate units such for example as voltage or current. The abscissa represents frequency and the plot it will be noted, is on a logarithmic scale. High fidelity is maintained over the major portion of the useful range, as all values shown are well above the noise level.

Figure 6 represents an actual chart obtained in testing a record element magnetized by a recording head constructed in accordance with the invention disclosed herein. Tape speed in this test was 7.5" per second and a bias frequency of 59 kc. was employed. These results of the actual tests are submitted as a matter of interest.

The drawings and the foregoing specification constitute a description of the improved magnetic recording apparatus in such full, clear, concise and exact terms as to enable any person skilled in the art to practice the invention, the scope of which is indicated by the appended claims.

What I claim as my invention is:

1. A transducer comprising a first strip of electrically conducting foil, a second strip of a highly permeable magnetic material folded around said first strip with the surfaces of said strips in contact and edges aligned, a third strip of highly permeable magnetic material folded with one leg in contact with the outer surface of one leg of the second strip and its other leg spaced from the other leg of the second strip, a fourth strip of electrically conducting foil intermediate said other leg of said second strip and the said other leg of said third strip, insulating means intermediate said fourth strip of electrically conducting foil and the adjacent legs of said strips of magnetic material, the edge of said fourth electrically conducting strip and the edge of said other leg of said third strip of magnetic material being aligned with the aligned edges of said first and second strips.

2. A magnetic recording head of the character described comprising a pair of magnets having a common intermediate pole and providing a pair of gaps at opposite sides of said intermediate pole, a strip of electrically conducting non-magnetic material in each of said gaps, and an energizing circuit in which both of said strips are connected in series to pass instantaneous energizing current through both of said strips from the same side of said head to the opposite side.

3. Structure as defined in claim 2 in which said circuit includes wires disposed with respect to said magnet poles and connected to said strips such as to constitute single turns around the leg of each magnet remote from the pole which said magnets have in common.

4. Structure as defined in claim 2 in which the poles of said magnets and said strips are metal foil pressed together to form a unitary solid body.

5. Structure as defined in claim 2 in which the gap of one magnet is substantially wider than the gap of the other.

References Cited in the file of this patent

UNITED STATES PATENTS

| Number | Name | Date |
|---|---|---|
| 1,653,467 | O'Neil | Dec. 20, 1929 |
| 1,828,189 | Kiliani | Oct. 20, 1931 |
| 2,265,831 | Woolridge | Dec. 9, 1941 |
| 2,418,542 | Camras | Apr. 8, 1947 |
| 2,475,421 | Camras | July 5, 1949 |
| 2,479,308 | Camras | Aug. 16, 1949 |
| 2,536,810 | Holmes | Jan. 2, 1951 |
| 2,567,092 | Williams | Sept. 4, 1951 |